United States Patent
Li

(10) Patent No.: US 8,619,855 B2
(45) Date of Patent: Dec. 31, 2013

(54) FAST MULTI-FRAME MOTION ESTIMATION WITH ADAPTIVE SEARCH STRATEGIES

(75) Inventor: Eric Li, Beijing (CN)

(73) Assignee: Intel Corporation, Santa Clara, CA (US)

(*) Notice: Subject to any disclaimer, the term of this patent is extended or adjusted under 35 U.S.C. 154(b) by 1000 days.

(21) Appl. No.: 12/559,995

(22) Filed: Sep. 15, 2009

(65) Prior Publication Data

US 2010/0034274 A1 Feb. 11, 2010

Related U.S. Application Data

(62) Division of application No. 11/004,004, filed on Dec. 3, 2004, now Pat. No. 7,609,765.

(30) Foreign Application Priority Data

Oct. 14, 2004 (WO) ................. PCT/CN2004/001172

(51) Int. Cl.
 *H04N 7/12* (2006.01)
 *H04N 11/02* (2006.01)
 *H04N 11/04* (2006.01)

(52) U.S. Cl.
 USPC ............ 375/240.12; 375/240.13; 375/240.14; 375/240.15; 375/240.16; 375/240.24

(58) Field of Classification Search
 USPC ............................ 375/240.12–240.16, 240.24
 See application file for complete search history.

(56) References Cited

U.S. PATENT DOCUMENTS

| | | | | |
|---|---|---|---|---|
| 5,668,600 | A * | 9/1997 | Lee | 375/240.16 |
| 6,078,618 | A | 6/2000 | Yokoyama et al. | |
| 6,269,121 | B1 * | 7/2001 | Kwak | 375/240.16 |
| 6,348,954 | B1 | 2/2002 | Takishima et al. | |
| 6,567,469 | B1 | 5/2003 | Rackett | |
| 7,327,494 | B2 * | 2/2008 | Aiso | 358/1.9 |
| 2003/0202596 | A1 | 10/2003 | Lainema et al. | |
| 2004/0114684 | A1 * | 6/2004 | Karczewicz et al. | 375/240.03 |
| 2004/0165663 | A1 | 8/2004 | Hanami | |
| 2004/0190613 | A1 * | 9/2004 | Zhu et al. | 375/240.12 |

(Continued)

FOREIGN PATENT DOCUMENTS

| | | |
|---|---|---|
| CN | 1518363 A | 8/2004 |
| EP | 1 198 140 A1 | 4/2002 |

(Continued)

OTHER PUBLICATIONS

"German Office Action" dated Mar. 31, 2009, along with English translation, Patent Application No. 112004002977.5-55, 17pgs.

(Continued)

*Primary Examiner* — Chikaodili E Anyikire
(74) *Attorney, Agent, or Firm* — Buckley, Maschoff & Talwalkar LLC

(57) ABSTRACT

A method includes examining a statistical distribution of motion vectors employed for motion compensation in a first frame of image data. The examining is to produce a distribution model of the motion vectors in the first frame. The method further includes selecting, based at least in part on the distribution model, a block-matching search pattern for use with respect to a second frame of image data. The second frame follows the first frame in a sequence of frames of image data.

13 Claims, 7 Drawing Sheets

(56) References Cited

U.S. PATENT DOCUMENTS

2004/0258154 A1* 12/2004 Liu et al. .................. 375/240.16
2005/0002455 A1* 1/2005 Lin et al. .................. 375/240.16
2006/0294171 A1* 12/2006 Bossen et al. .................. 708/300

FOREIGN PATENT DOCUMENTS

| EP | 1 465 432 A1 | 10/2004 |
| WO | 00/14682 A2 | 3/2000 |
| WO | 00/14682 A3 | 3/2000 |

OTHER PUBLICATIONS

"Chinese Office Action" dated Jun. 19, 2009, along with English translation, Patent Application No. 200480044126.3, 7pgs.

Jo Yew Tham et al., "A Novel Unrestricted Center-Biased Diamond Search Algorithm for Block Motion Estimation", Transactions Letters, IEEE Transactions on Circuits and Systems for Video Technology, vol. 8, No. 4, Aug. 1998, (pp. 369-377, total 9 pages).
Ce Zhu et al., "Hexagon-Based Search Pattern for Fast Block Motion Estimation", IEEE Transactions on Circuits and Systems for Video Technology, vol. 12, No. 5, May 2002, (pp. 349-355, total 7 pages).
Zhibo Chen et al., "Fast Integer Pel and Fractional Pel Motion Estimation for JVT", Joint Video Team (JVT) of ISO/IEC MPEG & ITU-T VCEG (ISO/IEC JTC1/SC29/WG11 and SG16 Q.6), 6th Meeting: Awaji, Island, JP, Dec. 5-13, 2002, 15pgs.
M. Ghanbari, "The Cross-Search Algorithm for Motion Estimation", IEEE Transactions on Communications, vol. 38, No. 7, Jul. 1990, (pp. 950-953, total 4 pages).

* cited by examiner

FAST MULTI-FRAME MOTION ESTIMATION WITH ADAPTIVE SEARCH STRATEGIES

CROSS-REFERENCE TO RELATED APPLICATION

This is a divisional of co-pending prior U.S. patent application Ser. No. 11/004,004 entitled "Fast Multi-Frame Motion Estimation with Adaptive Search Strategies" filed Dec. 3, 2004, which application is incorporated herein by reference.

BACKGROUND

Motion compensation is often employed in connection with compression-coding of image data. The proposed H.264 standard (more formally known as the Advanced Video Coding (AVC) standard, developed by the Joint Video Team (JVT) formed jointly by the Motion Picture Experts Group (MPEG) of the International Organization for Standardization (ISO) and the Video Coding Experts Group (VCEG) of the International Telecommunication Union Telecommunication Standardization Sector (ITU-T)) is an example of a technique for image data compression-coding using motion compensation. In H.264 coding, a rectangular block of pixel data is subtracted from a reference block in a previous frame, and the resulting difference information is transformed to produce co-efficient data. The coefficient data is quantized, and the resulting information is then reordered and entropy encoded for transmission and/or recording.

To take advantage of temporal redundancy in the video signal, even when there is motion and/or camera movement in the picture, the reference block may be displaced in the image frame from the block which is currently being coded. The displacement of the reference block is referred to as "motion compensation". The process of "motion estimation" determines which pixel block in the previous frame (within a search window) best matches the pixel block which is currently being coded. The displacement between the currently-coded block and the best matching block in the previous frame is indicated by a "motion vector", which is the result produced by the motion estimation process. The motion vector is included in "side information" that is transmitted along with the transformed, quantized, reordered, entropy-encoded difference information for the current block. The motion compensation allows for a minimization of the differences between the current pixel block and the reference block, so that the amount of data required to be transmitted/recorded can be minimized.

An issue that arises with motion-compensated video compression-coding is the amount of processing required for the coding. Motion estimation may comprise a significant part of the processing burden, particularly when a so-called "full search" algorithm is employed. So-called "fast search" algorithms have also been proposed, in which a reduced search pattern is employed, with small decreases in image quality.

DETAILED DESCRIPTION

Figure 1:
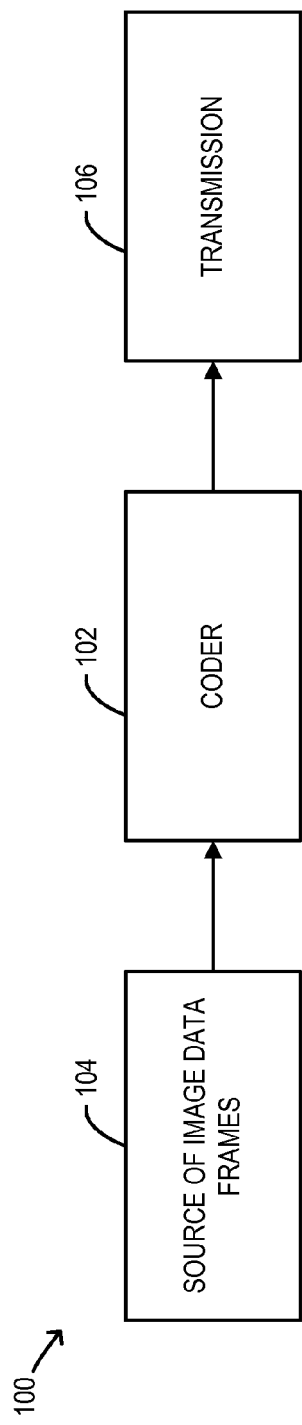
FIG. 1 is a high-level block diagram of an image data processing system according to some embodiments.

FIG. 1 is a block diagram of an image data processing system 100 according to some embodiments. The image data processing system 100 includes a compression-coding component 102 which is provided in accordance with some embodiments. The system 110 further includes a source 104 of image data frames. The source of image data frames is coupled to the compression-coding component to supply a sequence of image data frames to the compression-coding component. The source of image data frames may, for example, be a video camera, a tele-cine, a digital video tape reproducing device, etc.

The system 100 also includes a transmission channel 106. The compression-coding component is coupled to the transmission channel to provide compression-coded image data. The transmission channel may operate to transmit the compression-coded image data to another location and/or to store the compression-coded image data on a recording medium (not separately shown).

Figure 2:
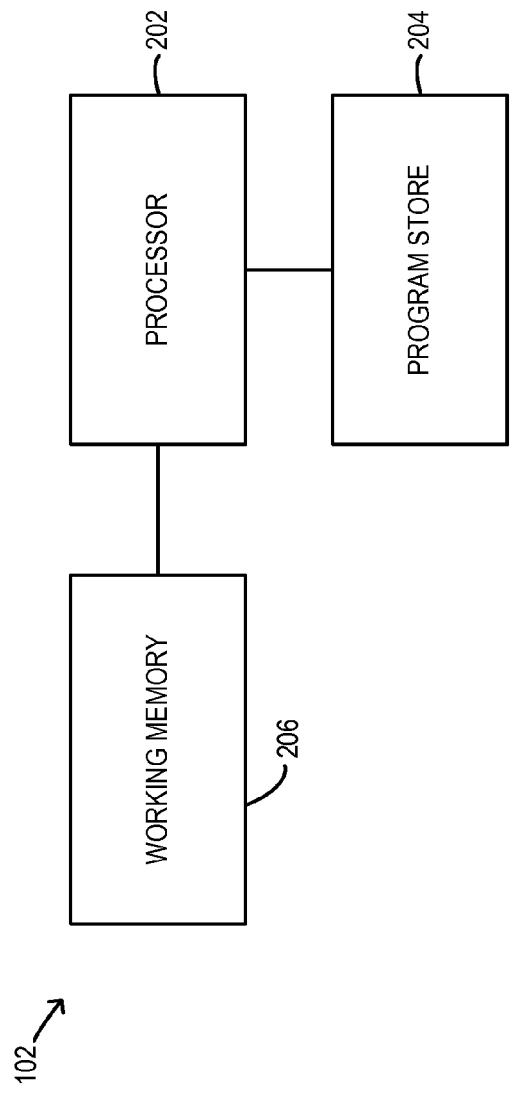
FIG. 2 is a block diagram of an image data compression-coding component of the system of FIG. 1.

FIG. 2 is a block diagram of an embodiment of the image data compression-coding component 102. The compression-coding component 102 may include a processor 202. The processor 202 may, for example, be a general purpose processor such as a conventional microprocessor and/or digital signal processor (DSP). The compression-coding component 102 may also include a storage device 204 which is coupled to the processor. The storage device 204 may store program instructions that control the processor to cause the processor to perform image data compression-coding in accordance with some embodiments, as described below.

The compression-coding component may also include working memory 206 (e.g., RAM—random access memory) coupled to the processor 202.

In other embodiments, the compression coding component 102 may be implemented as an application specific integrated circuit (ASIC) configured to perform image data compression-coding in accordance with some embodiments, as described below.

Figure 3:
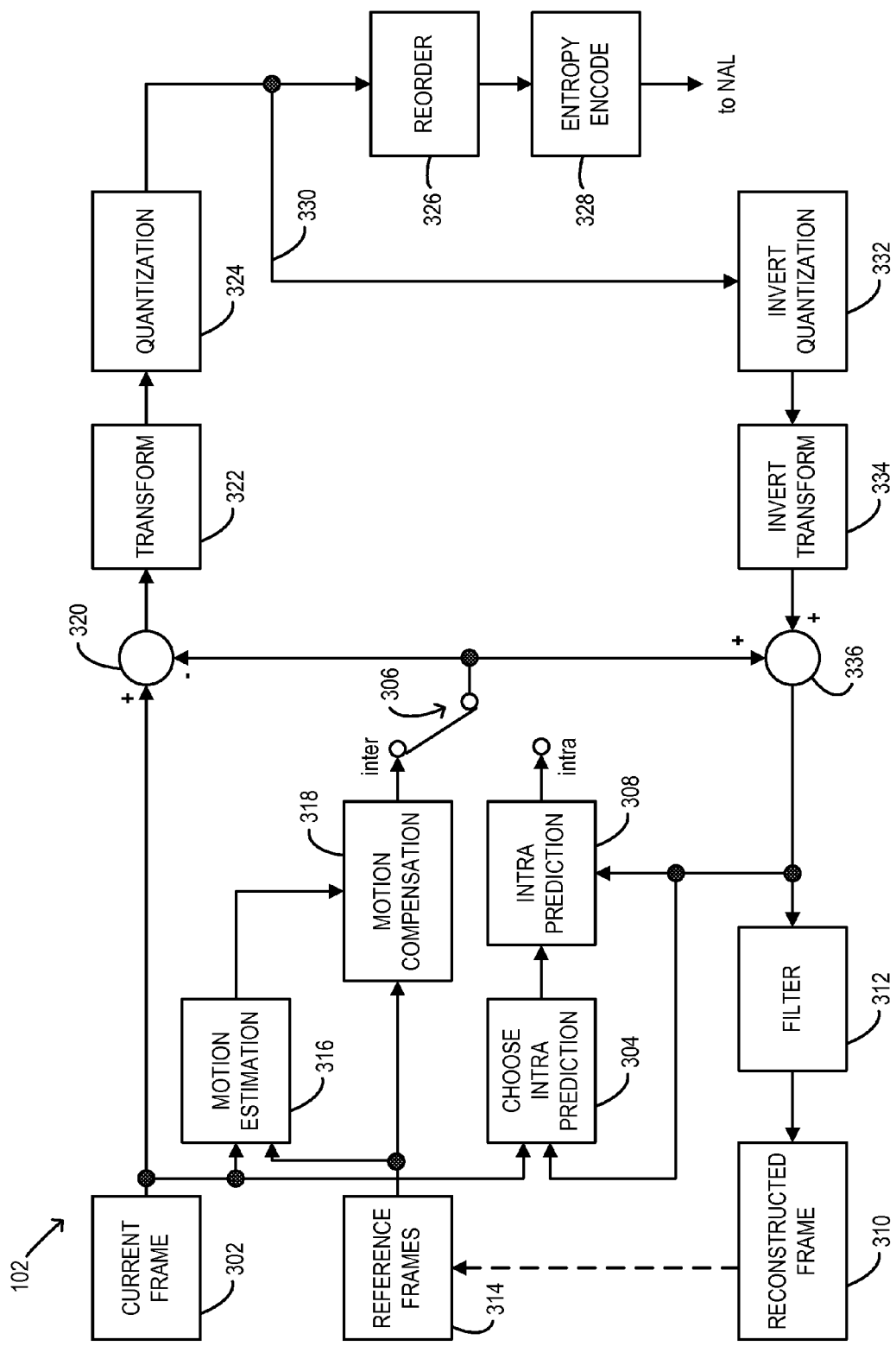
FIG. 3 illustrates in functional block form operation of the compression-coding component of FIG. 2.

FIG. 3 illustrates in functional block form operation of the compression coding component 102.

In FIG. 3, the input image data frame currently being compression-coded is indicated at 302. In accordance with the H.264 standard each "macroblock" (16×16 pixel block) may be processed separately. Moreover, each macroblock may be subdivided, if it is advantageous to do so, into 8×16, 16×8 or 8×8 blocks. Each 8×8 block may further be subdivided, again if it is advantageous to do so, into 8×4, 4×8 or 4×4 blocks.

Each macroblock, whether or not subdivided, may be encoded in either an "intra" or "inter" mode (i.e., either intraframe or interframe prediction). Selection of intra mode for a particular block is indicated at 304. Selection between an inter-predicted or intra-predicted reference block is indicated by a switch 306. The output of the switch 306 is the predicted reference block. The predicted reference block is taken from a reconstructed frame, which is either the currently processed frame (unfiltered) in the case of intra prediction 308, or a previous frame 310, that has been filtered at 312 and stored, possibly with one or more other previous frames, at 314.

In some embodiments, up to five previous reference frames may be selected from to provide the predicted reference block in the inter mode. These five previous frames may be referred to, in reverse chronological order, as "Ref0", "Ref1", "Ref2", "Ref3" and "Ref4". Ref0 may be the frame in the input sequence of image data frames that immediately precedes the frame currently being compression-coded; Ref1 may immediately precede Ref0 in the sequence of image data frames; Ref2 may immediately precede Ref1 in the sequence of image data frames; Ref3 may immediately precede Ref2 in the sequence of image data frames; and Ref4 may immediately precede Ref3 in the sequence of image data frames.

As indicated at 316, a motion estimation algorithm may be applied to a reference frame to find the best matching block or subblock in a reference frame for the current block or subblock in the current frame. Details of a motion estimation algorithm provided according to some embodiments are set forth below. Except for the motion estimation algorithm as described below, all of the compression-coding process illustrated in FIG. 3 may generally be performed in accordance with conventional principles, such as those set forth in the H.264 standard.

Using the motion vector produced by the motion estimation process 316, motion compensation 318 is applied to a reference frame to select a reference block. Via switch function 306, the reference block is supplied to a difference function 320, which subtracts the reference block from the block that is currently being compression-coded. (It will be noted that in intra mode a reference block from the current frame is used.) The difference data block generated by subtracting the reference block from the currently coded block is transformed by using a block transform (as indicated at 322), and the resulting transform coefficients are quantized, as indicated at 324. The quantized transform coefficients are then re-ordered (block 326) to improve coding efficiency and then subjected to entropy encoding (block 328). At this point a compressed bitstream has been produced, including the entropy encoded, re-ordered, quantized transform coefficients, as well as side information that identifies, e.g., prediction mode, quantization step size, block dimensions, motion vector, etc. The bitstream may be passed to a network abstraction layer (NAL) for transmission or storage.

A reconstruction branch process 330 takes the quantized transform coefficients and inverts the quantization (block 332) and then applies an inverse transform (block 334) to the de-quantized data, to produce difference data. The difference data is added at sum function 336 to the reference block to produce a reconstructed block. The resulting reconstructed block may be used for intra prediction at 308 or combined with other blocks to form a reconstructed frame that is filtered at 312 and stored at 314 as a reference frame for inter prediction.

Figure 4A:
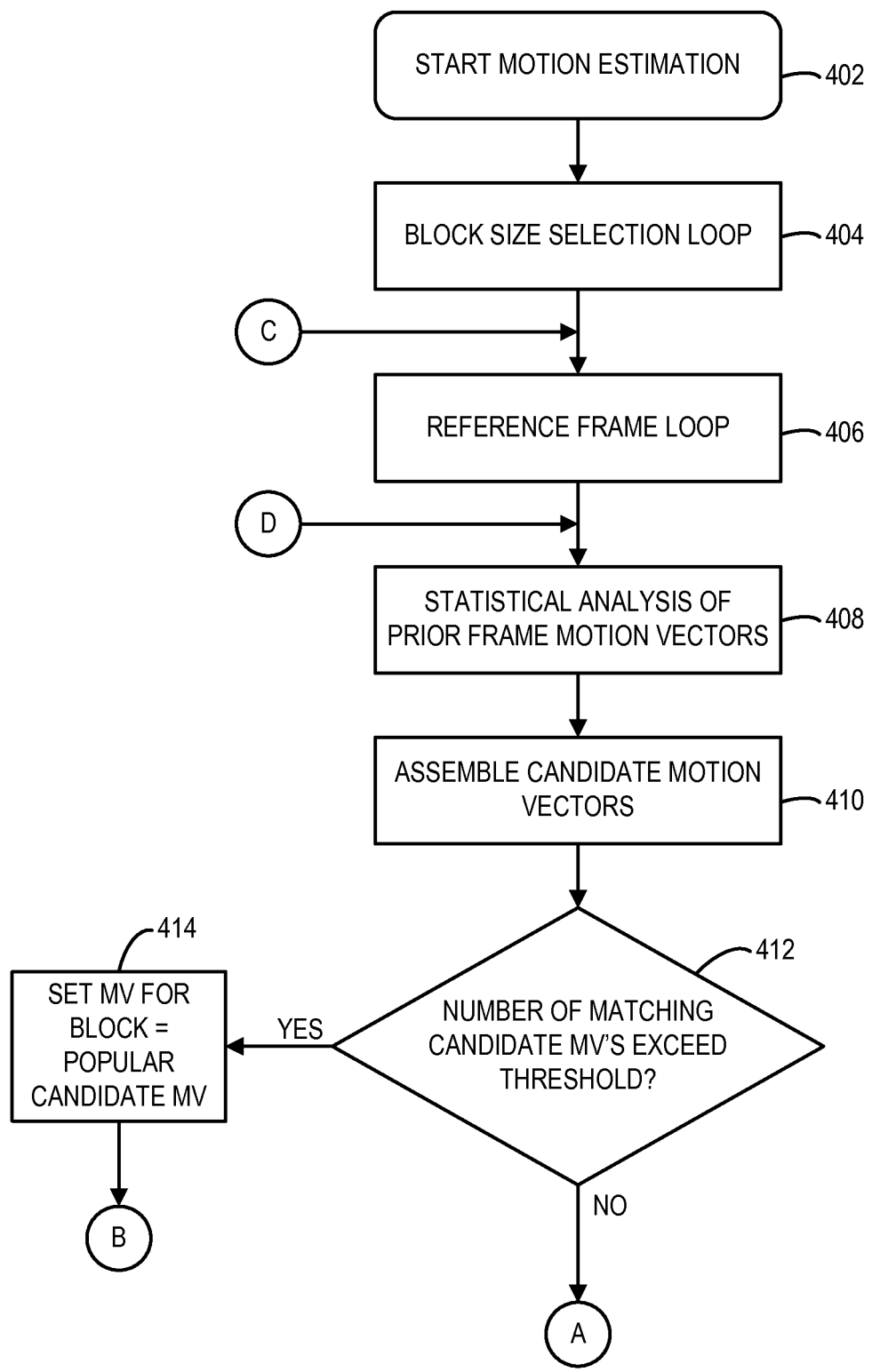
FIGS. 4A-4C together form a flow chart that illustrates a motion estimation process performed according to some embodiments by the compression-coding component of FIG. 2.
Figure 4B:
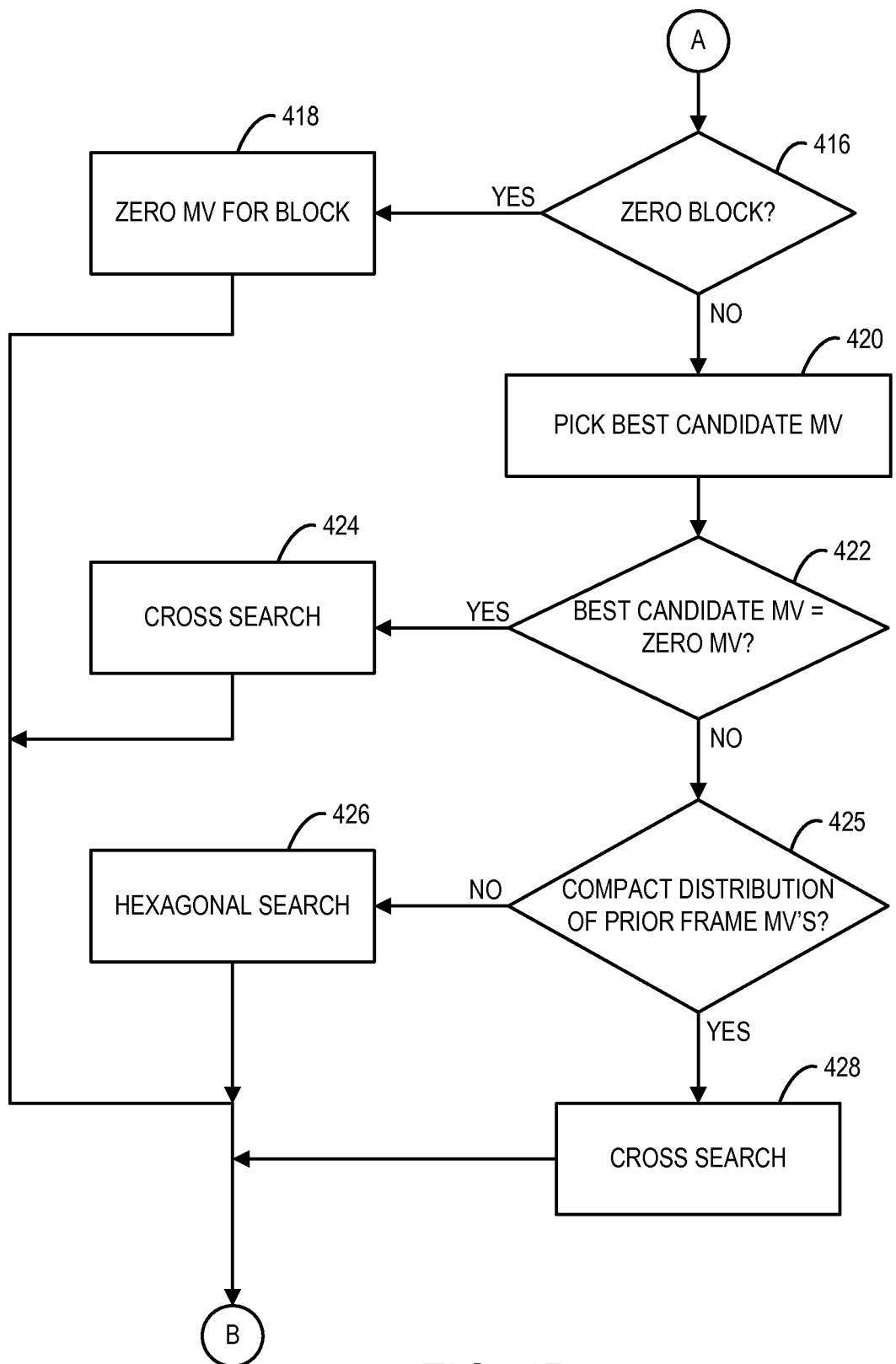
Figure 4C:
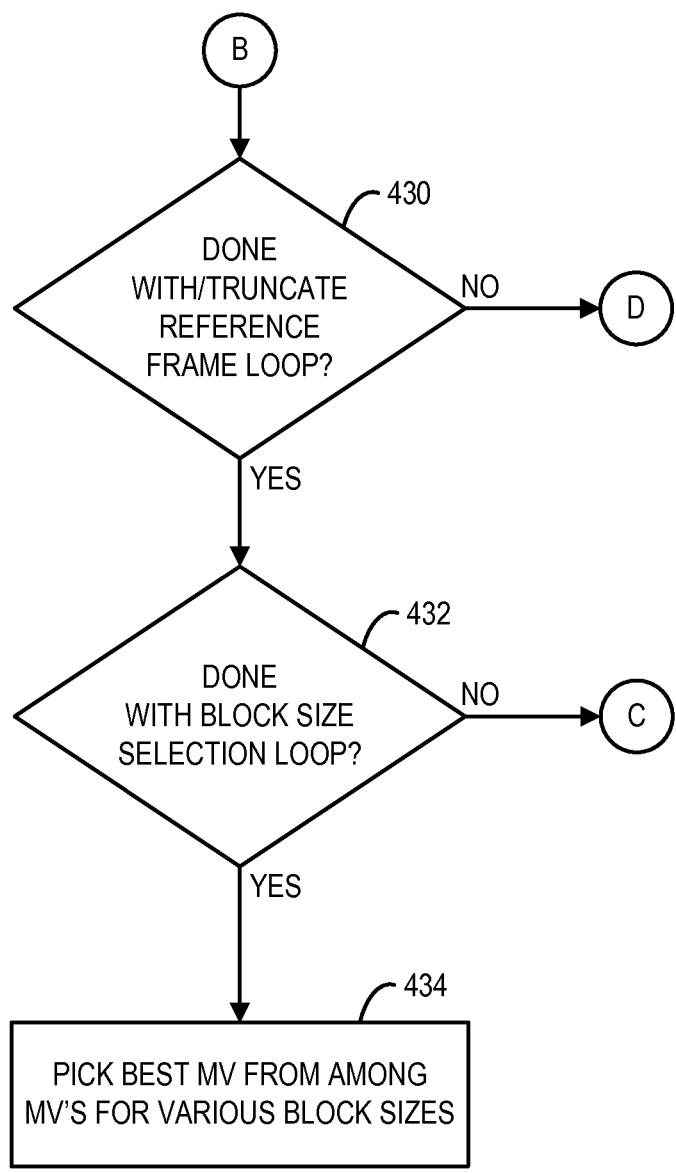

FIGS. 4A-4C together form a flow chart that illustrates the motion estimation algorithm 316 of FIG. 3, as provided in accordance with some embodiments.

In FIG. 4A, block 402 represents the start of the motion estimation algorithm with respect to one macroblock of the image data frame that is currently being compression-coded. Block 404 indicates that the motion estimation algorithm is applied to each of the possible different block or subblock sizes or shapes, to allow for selection of the optimum block size/shape from the point of view of minimizing the amount of difference data. In some embodiments, the block size selection loop 404 considers each of 16×16, 8×16, 16×8, 8×8, 4×8, 8×4 and 4×4 block sizes/shapes. The order in which the different block sizes are considered may follow decreasing size from 16×16 to 4×4 in order to make use of upper-layer motion vector information.

Nested within the block size selection loop 404 is a reference frame loop 406 which causes a full or truncated set of reference frames to be considered with respect to the current block/subblock. In some embodiments the full set of reference frames includes Ref0, Ref1, Ref2, Ref3, and Ref4, and the truncated set of reference frames includes Ref0, Ref1 and Ref2. In accordance with some embodiments, a selection is made between the full or truncated set of reference frames according to criteria which are described below. From another point of view, Ref0, Ref1 and Ref2 may be considered to form a first set of reference frames that is examined in all cases in some embodiments, whereas Ref3 and Ref4 may be considered to form a second (actually earlier) set of reference frames that sometimes is not examined in these embodiments. Ref0 may be referred to as the "last one" of the frames of the first set of reference frames; Ref1 may be referred to as the "middle one" of the frames of the first set of reference frames; Ref2 may be referred to as the "earliest one" of the frames of the first set of reference frames; Ref3 may be referred to as the "later one" of the frames of the second set of reference frames; and Ref4 may be referred to as the "earlier one" of the frames of the second set of reference frames. The order in which the reference frames are considered may be as stated in the second sentence of this paragraph (i.e., most recent considered first).

As used herein and in the appended claims, a "set of reference frames" need not include more than one frame.

Thus, for the macroblock currently being compression-coded, for the entire block or the subblock now under consideration, and for the reference frame currently under consideration, the following process goes forward. First, at block 408, a statistical analysis is performed with respect to the motion vectors that were produced when the motion estimation algorithm was applied to the reference frame currently being considered. It may be expected that the motion vectors approximately comply with symmetrical exponential distribution. The motion vectors may be assumed to be independent in the X and Y directions so that the combined probability distribution can be defined as:

$$P_{MV}(x, y) = P_X(x) P_Y(y), \quad (1)$$

where $P_X(x)$ and $P_Y(y)$ are the probability distributions of motion vectors in the X and Y directions, respectively. Both $P_X(x)$ and $P_Y(y)$ may comply with an exponential distribution as defined below:

$$P(n) = \lambda, \text{ for } n=0 \quad (2a)$$

$$P(n) = (1/2)\lambda \beta^{|n|}, \text{ for n nonzero} \quad (2b)$$

In view of the physical meaning of the probability distribution, Equation (2) should satisfy the constraint that the sum of probability in the search window is 1. In other words, if the size of the search window is W, the summation of P(n) over n in the range −W to W is equal to 1.

The mean absolute value $MV_{mean}$ of the motion vectors can be defined as the summation of $P(n)(|n|+1)$ over n in the range −W to W.

From the foregoing, the following can be obtained:

$$\lambda = 1/MV_{mean} \quad (3a)$$

$$\beta = 1 - (1/MV_{mean}) \quad (3b)$$

A probability distribution model of motion vectors in the reference frame currently being considered can be derived from $MV_{mean}$. (As is familiar to those who are skilled in the art, a "probability distribution model" of a variable, which may also be referred to as a "probability model" or "distribution model", is the range of the variable and associated probabilities.) Since $MV_{mean}$ varies rather slowly during a typical sequence of frames, $MV_{mean}$ can be used as a parameter to predict characteristics of future frames, such as the frame currently being encoded. It is likely that the motion vectors are distributed in a diamond shaped area. Thus it may be possible to find the smallest diamond shaped area in which at least 99% of the motion vectors are located. That is, the value M can be found that is the smallest value for which the summation of P(n) for n over the range −M to M is not less than 0.99. This condition may otherwise be expressed as $$\lambda(1+\beta+\beta^2+\ldots+\beta^M) >= 0.99 \quad (4)$$

It will be noted that the expression $\lambda(1+\beta+\beta^2+\ldots+\beta^M)$ can be evaluated based on the value of $MV_{mean}$ since both $\lambda$ and $\beta$ have been expressed in terms Of $MV_{mean}$. (Equation (3)).

The value of M arrived at by this process may also be referred to as the "ADL" (adaptive diamond length). Calculation of the ADL for the reference frame currently being considered, on the basis of the above results, is the outcome of the statistical analysis of block 408.

At block 410 a set of candidate motion vectors is assembled. In some embodiments, the set of candidate motion vectors includes all of the following:

(A) The respective motion vector (three in all) from each of the following blocks of the frame currently being compression-coded—the block above the currently considered block, the block above and to the right of the currently considered block, and the block to the left of the currently considered block; it will be appreciated that these three blocks adjoin the currently considered block;

(B) The respective motion vector for each block (if any) that is a superset of the currently coded block (If the currently considered block is the macroblock itself, then there is no block that is its superset; but for example if the currently considered block is an 8×16 block, then the 16×16 macroblock of the currently coded frame is a superset of the currently considered block; similarly, if the currently considered block is an 8×8 block, then there are 16×16, 8×16 and 16×8 blocks that are supersets of the currently considered block);

(C) The motion vector for the pixel block of Ref0 that corresponds in size and location in the image frame to the currently considered pixel block; and (D) A subset of candidate motion vectors, each obtained by applying a scaling factor to the respective motion vector for the pixel block of each of Ref1, Ref2, Ref3 and Ref4 that corresponds in size and location in the image frame to the currently considered pixel block. The scaling factor in each case may be proportional to the distance in time between the reference frame and the current frame.

At decision block 412, it is determined what is the largest number of the candidate motion vectors that are equal to each other and whether this number of motion vectors exceeds a threshold. If so, then as indicated at 414, this popular motion vector is considered to be the motion vector for the block currently being considered. Otherwise motion estimation for the block currently being considered continues with decision block 416 (FIG. 4B). At decision block 416, it is determined whether the currently considered pixel block is a zero block (all pixel data equal to zero). If so, the zero motion vector is considered the motion vector for the currently considered pixel block, as indicated at 418. Otherwise, each reference pixel block indicated by one of the candidate motion vectors is examined to determine the difference between the currently considered pixel block and the currently examined reference pixel block. The candidate motion vector which corresponds to the smallest such difference is temporarily selected (as indicated at 420) as the motion vector for the currently considered pixel block or the current frame, subject to further searching for an optimum matching reference pixel block, as described below.

It is next determined, at decision block 422, whether the candidate motion vector temporarily selected at 420 is the zero motion vector. If so, then as indicated at 424 a block matching search is conducted in the currently considered reference frame for the best matching reference pixel block, using a cross search pattern, as described below. Otherwise, it is determined whether a compact search area is expected (decision block 425) based on the statistical analysis of block 408 (FIG. 4A) and possibly based on other factors. For example, as a preliminary test, an average is obtained of the respective motion vector for each of the following adjoining pixel blocks in the currently coded frame: the block above the currently considered pixel block; the block above and to the right of the currently considered pixel block, and the block to the left of the currently considered pixel block. If this average is, say, at least equal to 4, then a hexagonal search pattern is employed for further block matching searching, as described below. Otherwise, the ADL calculated at 408 is compared with a threshold (e.g., 4) and if the ADL is at least equal to the threshold, the hexagonal search pattern is employed (as indicated at 426, FIG. 4B). Otherwise (i.e., if ADL<the threshold), then the cross search pattern is employed, as indicated at 428.

Figure 5:
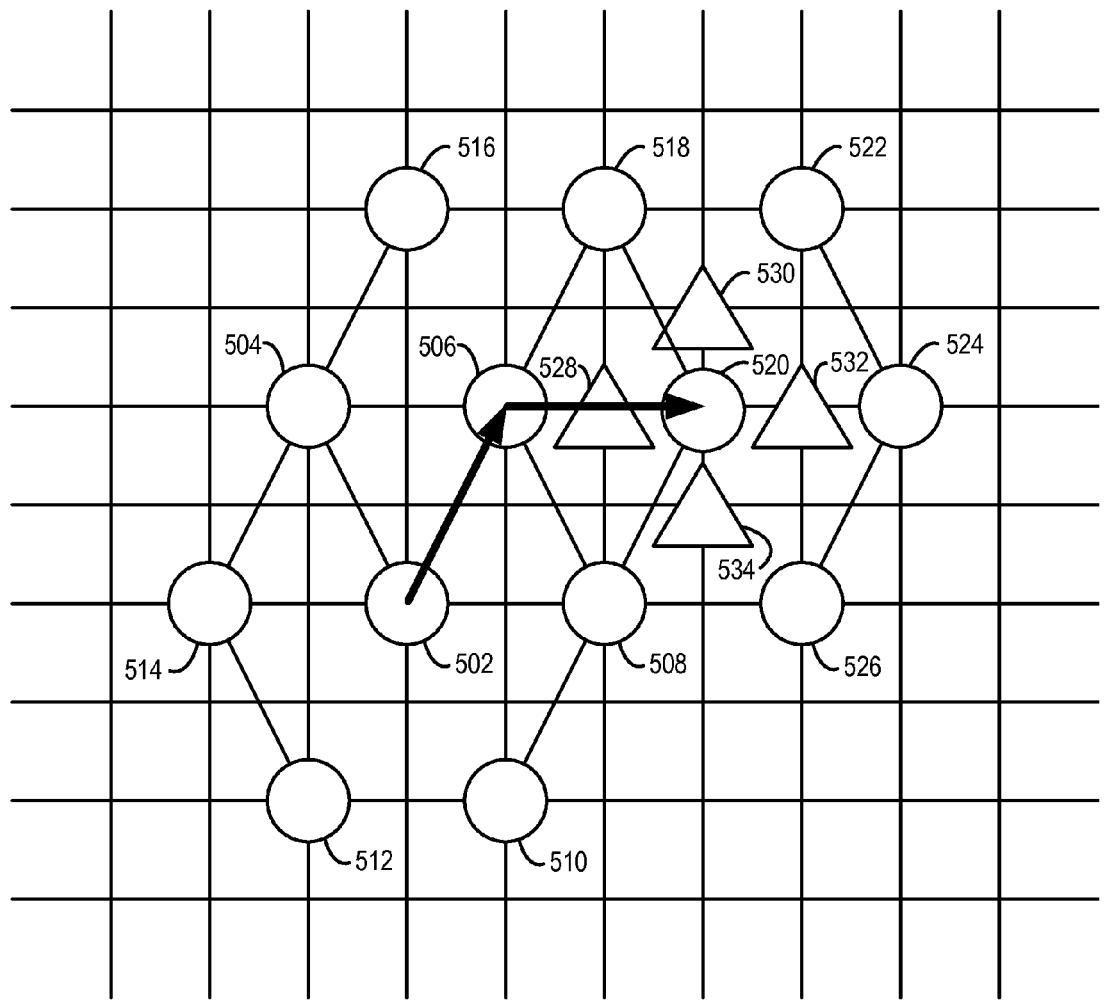
FIG. 5 schematically illustrates a hexagonal search pattern used on some occasions in the motion estimation process of FIGS. 4A-4C.

An example of a hexagonal search pattern is schematically illustrated in FIG. 5. An example of a hexagonal search pattern is also described in an article entitled, "Hexagon-Based Search Pattern for Fast Block Motion Estimation", by Ce Zhu et al., IEEE Transactions on Circuits and Systems for Video Technology, Vol. 12, no. 5, May 2002; pages 349-355.

In FIG. 5, each intersection of the grid corresponds to a pixel location in the reference frame currently under consideration. The search starting point 502 at the center of the initial hexagonal search pattern corresponds to the pixel location indicated by the candidate motion vector temporarily selected at 420 (FIG. 4B). Continuing to refer to FIG. 5, each of the other six search points 504, 506, 508, 510, 512, 514 which makes up the balance of the initial hexagonal search pattern is either 2 pixels over, or 2 pixels up or down and one pixel over, from the search starting point 502. The respective (candidate) reference pixel blocks corresponding to the seven initial search points are each compared with the pixel block currently under consideration for coding, and the search point corresponding to the candidate reference pixel block which best matches the pixel block currently under consideration for coding is declared the "winner". It will be assumed for the purposes of this example that point 506 is the winner. An extension of the hexagonal search pattern in the direction of the winner then occurs, resulting in this case in the additional search points 516, 518, 520. The winner among these three new points and the previous winner 506 is then determined. Again for purposes of this example, it is assumed that point 520 is the new winner. Once more the search pattern is extended in the direction of the new winner, resulting in new search points 522, 524, 526 in this case. Again the new search points and the most recent winner are compared. It is now assumed that point 520 remains the winner at this new round. As a result, a small pattern of four points 528, 530, 532, 534 immediately above, below and to the sides of the winner 520 are compared with each other and with 520, and the winner among these five is selected as the motion vector for the pixel block currently under consideration for coding.

The hexagonal search pattern described above may provide for efficient searching when a relatively large area may need to be traversed. As another example of the hexagonal search pattern, the pattern formed by points 502, 504, 506, 508, 510, 512 and 514 may be rotated by 90° around point 502 to provide an alternative initial hexagonal search pattern.

Figure 6:
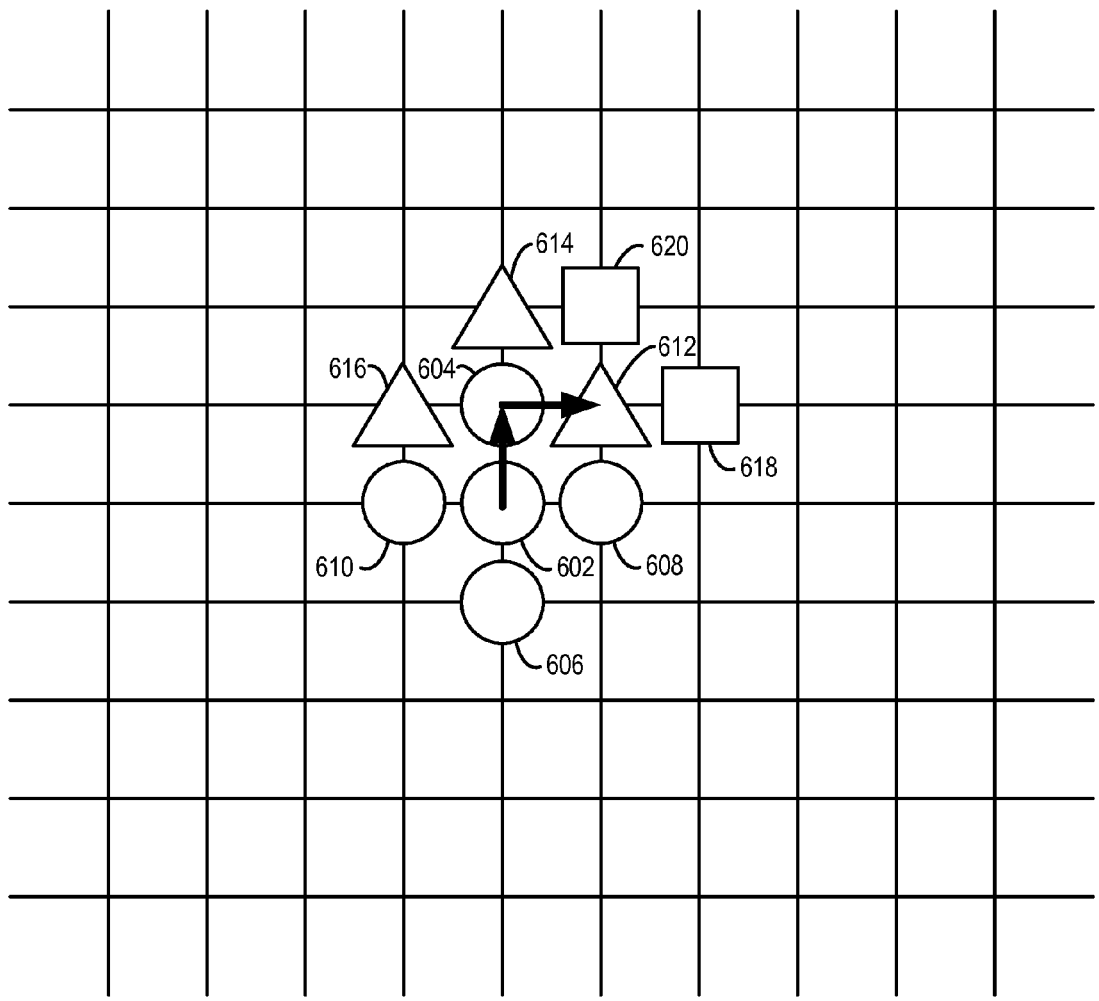
FIG. 6 schematically illustrates a cross search pattern used on some other occasions in the motion estimation process of FIGS. 4A-4C.

An example of a cross search pattern is schematically illustrated in FIG. 6.

As in FIG. 5, the intersections of the grid in FIG. 6 each correspond to a pixel location in the reference frame currently under consideration. The search starting point 602 corresponds to the pixel location indicated by the candidate motion vector temporarily selected at 420 (FIG. 4B). Continuing to refer to FIG. 6, the balance of the initial cross (i.e., cross-shaped) search pattern consists of the four points 604, 606, 608 and 610 which are immediately above, below and to the sides of the starting point 602. The respective (candidate) reference pixel blocks corresponding to the five initial search points are each compared with the pixel block currently under consideration for coding, and the search point corresponding to the candidate reference pixel block which best matches the pixel block currently under consideration for coding is declared the winner. It will be assumed for the purposes of this example that point 604 is the winner. An extension of the cross search pattern in the direction of the winner then occurs, resulting in three additional search points 612, 614, 616 in this case. The winner among these three new search points and the previous winner 604 is then determined. Again for purposes of this example, it is assumed that point 612 is the new winner. Once more the search pattern is extended in the direction of the winner, yielding new search points 618, 620. (If 614 had been the winner there would have been three new search points.) It is next assumed that 612 remains the winner when points 618 and 620 are considered, so that the search ends, and 612 is selected as the motion vector for the pixel block currently under consideration for coding.

The cross search pattern described above may provide for efficient searching when a relatively small area may need to be traversed. In some embodiments, the likely better search pattern between hexagonal and cross is adaptively selected, based at least in part on the statistical distribution of motion vectors in a reference frame that is prior to the frame currently being coded. This may take advantage of the temporal predictive value of the motion vector distribution in the earlier frame to predict the likely distribution in the current frame. A threshold value other than 4 may alternatively be used.

Once the motion vector has been determined for the pixel block of the current frame that is currently being processed, and for the reference frame that is currently being considered, it is next determined (decision block 430, FIG. 4C) whether the reference frame loop is complete. This may include a determination as to whether the reference frame loop should be truncated by, e.g., omitting Ref3 and Ref4 from consideration. The latter determination may be made when consideration of Ref2 is complete, at which point respective motion vectors have been determined for the current pixel block of the current frame for each of Ref0, Ref1 and Ref2.

In some embodiments, consideration of Ref3 and Ref4 may be skipped if the following conditions are met:

$|(2 \times MV_{Ref0}) - MV_{Ref1}| < T_{MV};$  (A)

$|(3 \times MV_{Ref0}) - MV_{Ref2}| < T_{MV};$  (B)

$Cost_{Ref0} < Cost_{Ref1};$  (C)

and $Cost_{Ref0} < Cost_{Ref2}.$  (D)

In the foregoing set of conditions, $MV_{Ref0}$ is the motion vector determined for the currently coded pixel block with respect to Ref0; $MV_{Ref1}$ is the motion vector determined for the currently coded pixel block with respect to Ref1; $MV_{Ref2}$ is the motion vector determined for the currently coded pixel block with respect to Ref2; and $T_{MV}$ is a threshold employed for the reference frame loop truncation decision (in some embodiments, $T_{MV}$ may be equal to 4). Further, "Cost" is a cost function that measures the cost of coding the currently coded pixel block as a difference relative to the reference pixel block pointed to in the respective reference frame by the motion vector determined for that frame. In other words, the "Cost" function indicates a degree of block matching between the currently coded pixel block and the proposed reference pixel block for the respective reference frame. It will also be appreciated that a determination of whether the four conditions listed above have been satisfied constitutes an evaluation of a result of motion estimation performed with respect to the current frame (and specifically the current pixel block of the current frame) with reference to Ref0, Ref1 and Ref2. In other embodiments, the evaluation of such motion estimation may be performed in other ways.

If all four of the above conditions are satisfied, it may be concluded that consideration of Ref1 and Ref2 did not produce a better block match than Ref0, and that it is highly unlikely that consideration of Ref3 and Ref4 would produce a better block match. It is therefore determined that the reference frame loop should be truncated by skipping consideration of Ref3 and Ref4, to save on processing resources and speed up completion of motion estimation.

Thus at decision block 430 the reference frame loop ends if either the reference frame just considered is Ref4 or if the reference frame just considered is Ref2 and the conditions for truncating the reference frame loop are satisfied. If the reference frame loop does not end, the process of FIGS. 4A-4C loops back to 408 in FIG. 4A, and the next (i.e., next earlier) reference frame is considered. If the reference frame loop ends, then the process advances from decision block 430 (FIG. 4C) to decision block 432.

It should be understood that in some embodiments, the total number of reference frames potentially considered may be other than five, and/or the number of reference frames skipped when warranted based on results of considering later reference frames may be other than two.

At decision block 432 it is considered whether all of the different block sizes/shapes have been considered for the currently coded pixel macroblock. If not, the process of FIGS. 4A-4C loops back to 406 and the next block size/shape is considered. Otherwise (i.e., if all block sizes/shapes have been considered) the process advances to block 434 in FIG. 4C.

At block 434, the best block size/shape (i.e., the block size/shape for which the best matching is found), is selected for purposes of coding the current pixel macroblock. In some embodiments this may be done in accordance with conventional practices. It will also be understood that the best matching reference block will have been selected for each size/shape of block from among the respective reference blocks for the various reference frames considered. This too may have been done in accordance with conventional practices. Thus motion estimation for the current macroblock is now complete, and the process of FIGS. 4A-4C may now be applied to the next macroblock of the current frame.

With the process described above with reference to FIGS. 4A-4C, motion estimation may be performed more rapidly than with other "fast" motion estimation algorithms, with comparable results in terms of image quality.

The order in which the various portions of the motion estimation algorithm are performed may be changed from the order indicated in FIGS. 4A-4C.

The selection of a block-matching search pattern at block 424 (FIG. 4B) need not be limited to selection between two search patterns, and may select between search patterns other than a hexagonal search pattern and a cross search pattern.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
performing first motion estimation with respect to a current frame of a sequence of frames of image data, the first motion estimation being performed with reference to a first set of reference frames, said first set of reference frames preceding said current frame in said sequence of frames of image data;
evaluating a result of said first motion estimation; and
determining, based on an outcome of said evaluating, whether to perform second motion estimation with respect to said current frame, said second motion estimation to be performed with reference to a second set of reference frames different from said first set of reference frames, said second set of reference frames preceding said first set of reference frames in said sequence of frames of image data wherein:
said first set of reference frames includes three reference frames that immediately precede said current frame in said sequence of frames of image data; and
said second set of reference frames includes two frames that immediately precede said first set of reference frames in said sequence of frames of image data.

2. The method of claim 1, wherein said evaluating includes comparing with a threshold a difference between a first motion vector obtained with reference to a middle one of said frames of said first set of reference frames and a multiple of a second motion vector obtained with reference to a last one of said frames of said first set of reference frames.

3. The method of claim 1, wherein said evaluating includes comparing with a threshold a difference between a first motion vector obtained with reference to an earliest one of said frames of said first set of reference frames and a multiple of a second motion vector obtained with reference to a last one of said frames of said first set of reference frames.

4. The method of claim 1, wherein said evaluating includes comparing a degree of block matching obtained with reference to a middle one of said frames of said first set of reference frames with a degree of block matching obtained with reference to a last one of said frames of said first set of reference frames.

5. The method of claim 1, wherein said evaluating includes comparing a degree of block matching obtained with reference to an earliest one of said frames of said first set of reference frames with a degree of block matching obtained with reference to a last one of said frames of said first set of reference frames.

6. The method of claim 1, wherein said evaluating includes:
comparing with a threshold a difference between two times a first motion vector obtained with reference to a last one of said frames of said first set of reference frames and a second motion vector obtained with reference to a middle one of said frames of said first set of reference frames;
comparing with said threshold a difference between three times the first motion vector and a third motion vector obtained with reference to an earliest one of said frames of said first set of reference frames;
comparing a degree of block matching obtained with reference to said middle one of said frames of said first set of reference frames with a degree of block matching obtained with reference to said last one of said frames of said first set of reference frames; and
comparing a degree of block matching obtained with reference to said earliest one of said frames of said first set of reference frames with said degree of block matching obtained with reference to said last one of said frames of said first set of reference frames.

7. The method of claim 1, wherein said first set of reference frames includes at least two frames.

8. The method of claim 7, wherein said evaluating includes comparing a degree of block matching obtained with reference to an earlier one of said frames of said first set of reference frames with a degree of block matching obtained with reference to a later one of said frames of said first set of reference frames.

9. The method of claim 7, wherein said evaluating includes calculating a difference by subtracting a first motion vector obtained with reference to said later one of said frames from a multiple of a second motion vector obtained with reference to said earlier one of said frames.

10. The method of claim 9, wherein said evaluating further includes comparing said difference with a threshold.

11. The method of claim 1, wherein each reference frame comprises a plurality of macroblocks.

12. A method comprising:
performing first motion estimation with respect to a current frame of a sequence of frames of image data, the first motion estimation being performed with reference to a first set of reference frames, said first set of reference frames preceding said current frame in said sequence of frames of image data;
evaluating a result of said first motion estimation; and
determining, based on an outcome of said evaluating, whether to perform second motion estimation with respect to said current frame, said second motion estimation to be performed with reference to a second set of reference frames different from said first set of reference frames, said second set of reference frames preceding said first set of reference frames in said sequence of frames of image data,
wherein said first motion estimation includes:
determining a plurality of candidate motion vectors for a first pixel block in said current frame, the candidate motion vectors including at least two of the following:
(a) a motion vector for a pixel block that adjoins the first pixel block;
(b) a motion vector for a pixel block that is a superset of the first pixel block;
(c) a motion vector for a second pixel block that is part of a reference frame that is a last frame in said first set of reference frames, said second pixel block having a position in said reference frame that corresponds to a position of the first pixel block in said current frame; and
(d) a scaled motion vector for a third pixel block that is part of another reference frame, said another reference frame preceding said last frame in said first set of reference frames, said third pixel block having a position in said another reference frame that corresponds to a position of the first pixel block in said current frame;

determining a number of said plurality of candidate motion vectors that are the same; and comparing said number to a threshold;

and wherein said first motion estimation further includes:

determining a characteristic of a frame of image data that is prior to said current frame in the sequence of frames; and selecting, on the basis of the determined characteristic, a block-matching search pattern for use with respect to said current frame, said prior frame immediately preceding said current frame in said sequence of frames, wherein said determining said characteristic of said prior frame includes analyzing a statistical distribution of motion vectors for said prior frame, wherein said selecting includes selecting between a hexagonal search pattern and a cross search pattern said first set of reference frames includes three reference frames that immediately precede said current frame in said sequence of frames of image data and wherein said second set of reference frames includes two frames that immediately precede said first set of reference frames in said sequence of frames of image data.

13. The method of claim 12, wherein each reference frame comprises a plurality of macroblocks.

\* \* \* \* \*